United States Patent [19]

Shigemasa

[11] Patent Number: 4,493,964

[45] Date of Patent: Jan. 15, 1985

[54] METHOD OF JOINING ELECTRICALLY CONDUCTIVE MEMBERS

[75] Inventor: Saito Shigemasa, Kanagawa, Japan

[73] Assignee: Fuji Electric Co., Ltd., Kanagawa, Japan

[21] Appl. No.: 300,532

[22] Filed: Sep. 9, 1981

Related U.S. Application Data

[63] Continuation of Ser. No. 54,052, Jul. 2, 1979, abandoned.

[30] Foreign Application Priority Data

Jun. 30, 1978 [JP] Japan ............................ 53-80048
Jun. 30, 1978 [JP] Japan ............................ 53-80049

[51] Int. Cl.³ ........................................... B23K 11/20
[52] U.S. Cl. .............................. 219/78.02; 219/78.01; 219/117.1; 219/118
[58] Field of Search ............... 219/78.01, 78.02, 117.1, 219/118, 78.13; 228/193

[56] References Cited

U.S. PATENT DOCUMENTS

| | | | |
|---|---|---|---|
| 1,602,682 | 10/1926 | Kochendorfer | 219/78.13 |
| 2,350,532 | 6/1941 | Richardson | 219/117.1 X |
| 3,592,993 | 7/1971 | Bennett | 219/118 X |
| 3,859,491 | 1/1975 | Larson | 219/117.1 X |
| 4,291,215 | 9/1981 | Bennett et al. | 219/78.02 X |

OTHER PUBLICATIONS

*Welding Handbook,* 6th edition, Section 3, Part B, "Welding, Cutting and Processes", American Welding Society, New York, NY, 1971.
American Society for Metals, *Metals Handbook,* 8th edition, vol. 6, "Resistance Spot Welding", 1971, p. 401.

*Primary Examiner*—Clifford C. Shaw
*Assistant Examiner*—C. M. Sigda
*Attorney, Agent, or Firm*—Sughrue, Mion, Zinn, Macpeak, and Seas

[57] ABSTRACT

A method of joining a plurality of electrically conductive members is disclosed which comprises the steps of placing the metal members in stack between a pair of electrodes, heating the members to a predetermined temperature range by feeding an electric current through the members while applying a predetermined pressure to the members and cooling the members quickly.

5 Claims, 10 Drawing Figures

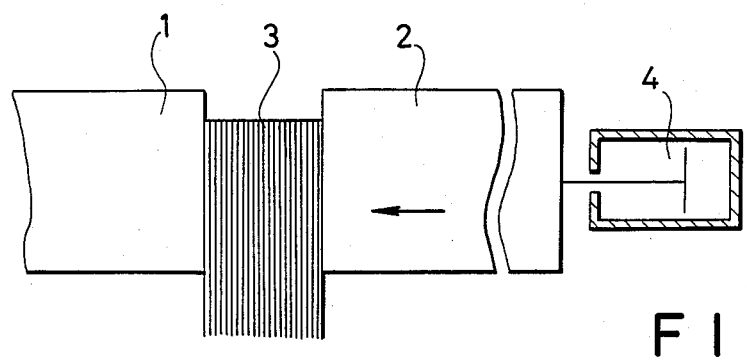
FIG. 1
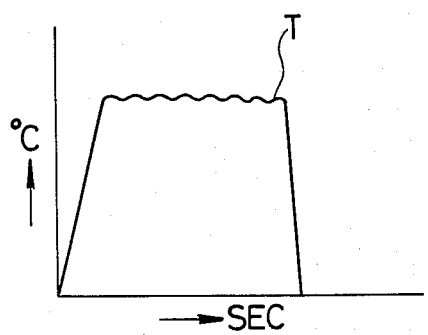
FIG. 2
FIG. 9
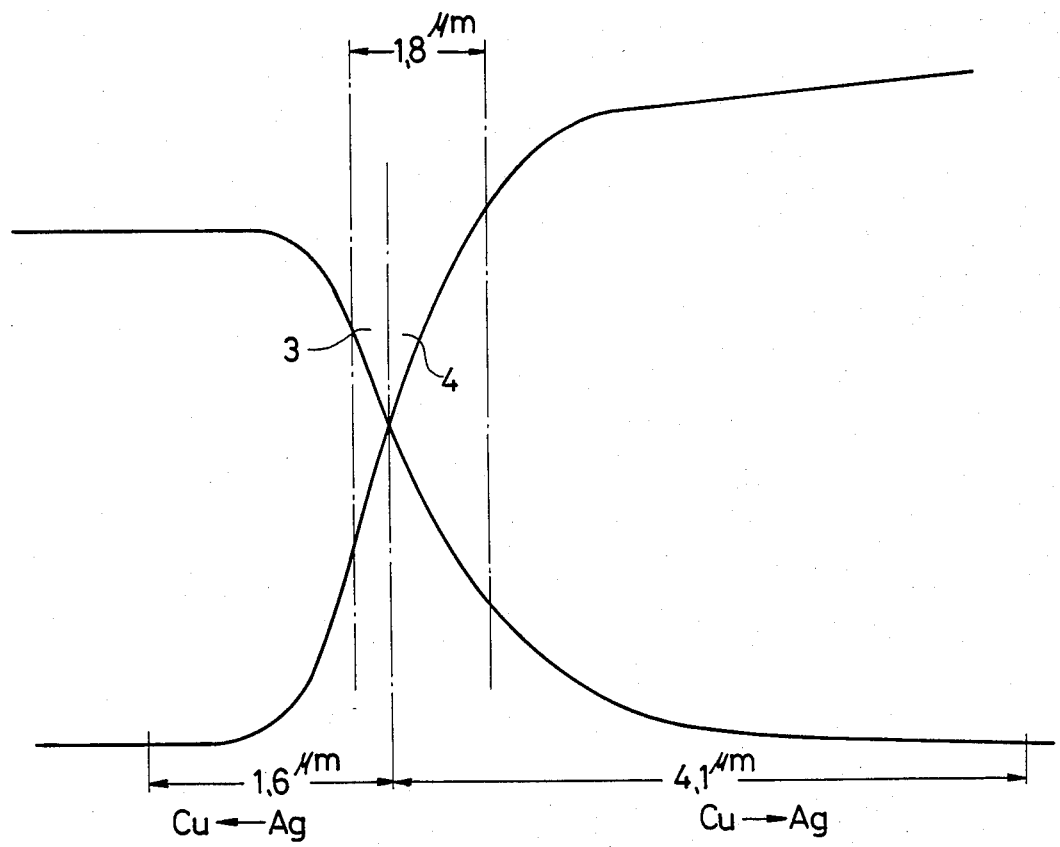

F I G. 6
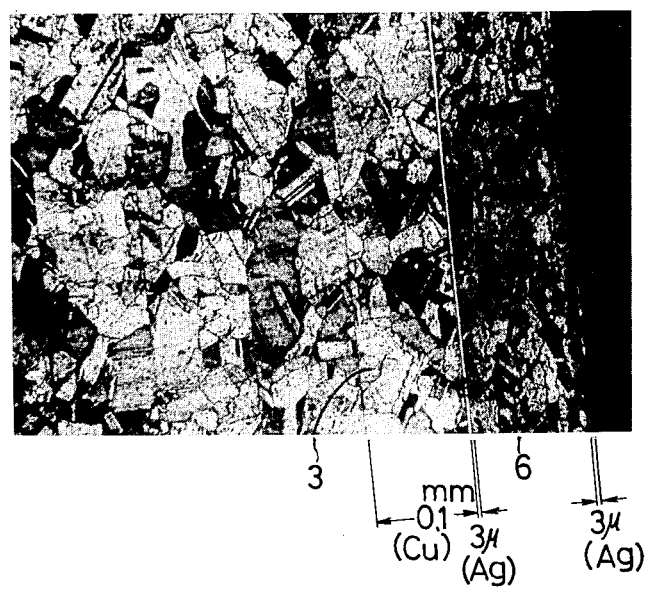
F I G. 7
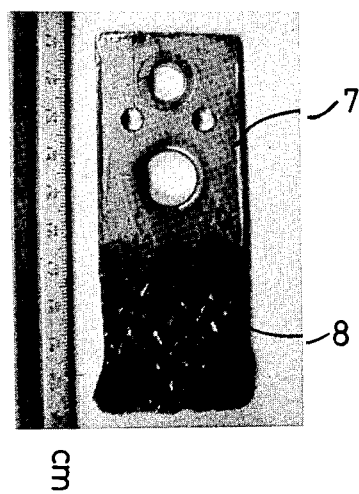

METHOD OF JOINING ELECTRICALLY CONDUCTIVE MEMBERS

This is a continuation of application Ser. No. 54,052, filed July 2, 1979, now abandoned.

BACKGROUND OF THE INVENTION

This invention relates to a method of joining metal members and, more particularly, to a method of joining a plurality of electrically conductive members together.

In order to achieve the joining of metal members together, mechanical methods including caulking, pressure welding, and cladding; and welding methods including brazing, soldering and fusion; welding have been employed.

In the mechanical method, a great force is mechanically applied to the members to be joined. Accordingly it is necessary to provide materials high in ductility such as Ag-Ni and Ag which can sufficiently withstand plastic deformation. These materials are low in wear resistance and are liable to be molten at high temperature. Therefore, the method is limited to the manufacture of laminated conductors of relatively small size and capacity. Further, as to the caulking method, a resultant conductor caulking is low in current feeding performance. As the number of components is increased, the manufacturing cost is increased.

In the welding method, the low melting point alloy layer of the brazing material and the base material forms voids in the course of cooling. As the voids occupy 20 to 30% of the junction area, the thermal characteristic is lowered, and furthermore the mechanical strength is also lowered. Thus, the electrical conductor manufactured by this method is low in reliability. In addition, in the welding method, the flux and brazing material being used become colloidal, which is an obstruction to automation and labor-savings. Air pollution attributing to the fumes produced by the oxidation of cadmium included in the brazing material is a serious problem in manufacturing electrical contactors. In order to eliminate this difficulty, it is necessary to plate the junction surface with silver in advance, which results in an increase in the manufacturing cost.

SUMMARY OF THE INVENTION

Accordingly, an object of this invention is to eliminate all of the above-described difficulties accompanying conventional methods and to provide a method of joining a plurality of electrically conductive members which is simple and low in manufacturing cost.

The foregoing object of the invention has been achieved by the provision of a method which comprises the steps of: inserting a plurality of conductors in a stack which are placed one on another, between two electrodes having confronted parallel surfaces; heating the conductors by feeding electric current between the two electrodes while pressurizing them by means of the two electrodes; and thereafter quickly cooling the contact support and contact. In this method, it is preferable that while a pressure of 0.02 to 1 kg/mm² is applied to the conductors, they are heated to a temperature of 270° C. to 900° C., and thereafter quickly cooled in water. In a case where the conductors to be joined are a contact support and a contact, the temperature to which they are heated may be preferably 400° C. to 900° C. and in a case where the conductors are thin strips the temperature may be preferably 270° C. to 810° C.

BRIEF DESCRIPTION OF THE DRAWINGS

FIG. 1 is a longitudinal sectional view of a joining device applied to join a plurality of conductor strips, according to this invention;

FIG. 2 is a graphical representation indicating a heating temperature curve in the method of the invention;

FIG. 6 shows a microscope picture of the section, enlarged 170 times, of a third example of the laminated conductor manufactured according to the method of the invention;

FIG. 7 is a picture showing a front view of a fourth example of the laminated conductor manufactured according to the method of the invention;

FIG. 9 is a graphical representation schematically indicating the results of the analysis of the junction in FIG. 8, which is conducted by using an X-ray microanalyser.

DETAILED DESCRIPTION OF THE PREFERRED EMBODIMENTS

Figure 3:
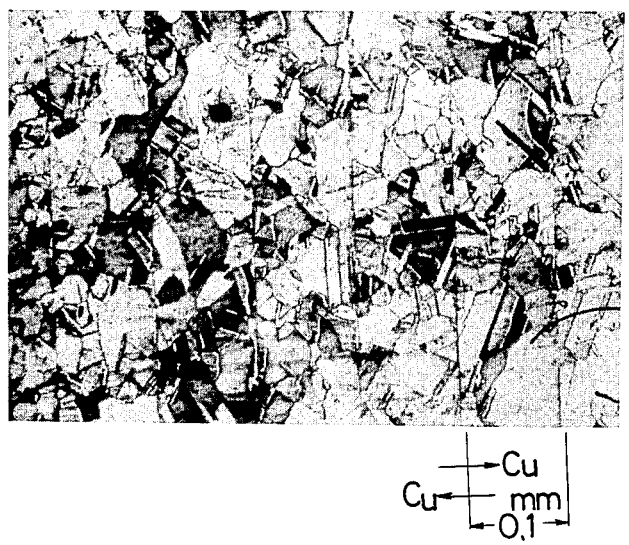
FIG. 3 shows a microscope picture, enlarged 170 times, of the section of a first example of a laminated conductor manufactured according to the method of the invention.

FIG. 1 is a longitudinal sectional view of a joining device used to join conductive members according to the invention. As shown in FIG. 1, carbon electrodes 1 and 2 are disposed so that the parallel surfaces thereof are confronted with each other. The electrode is moved by air pressure generated in a cylinder 4. A suitable number of plate-shaped conductive members 3 are placed one on another, and are then inserted between the electrodes 1 and 2. The conductive members 3 are pressurized by moving the electrode 2 in the direction of the arrow with the cylinder 4. In this operation, the pressure applied to the members 3 is within in a range of from 0.02 kg/mm² to 1 kg/mm². When the pressure is smaller than 0.02 kg/mm², satisfactory results cannot be obtained and when it is larger than 1 kg/mm², the conductive members are plastically deformed. An electric current (AC or DC about 6000 to 15,000 A) is applied to the electrodes 1 and 2 from a power source (not shown), so as to heat the laminated conductive members 3. As indicated by a heating temperature curve shown in FIG. 2 the temperature of the conductive members 3 is increased to a temperature T (270°–900° C., preferably 270°–810° C.) in about fifteen seconds in a suitable atmosphere such as air by Joule heat. Thereafter, the temperature of the conductive members is maintained at a temperature of T±50° C. for one to three minutes suitably. Then, the conductive members 3 are allowed to stand in the atmosphere to cool them, as the case may be. Thereafter, the conductive members 3 are quickly cooled in water. Thus, the joining of the conductive members 3 has been completed.

In a case where the conductive members to be joined together are a contact and a contact support, the temperature to which they are heated may be preferably 400° to 900° C. and the time period for which the temperature is maintained may be shorter than that of the latter case. The temperature and the time depend on the product to be obtained.

Now, the present invention will be described in detail with reference to the following examples.

EXAMPLE 1

One hundred and eighty (180) conductive members 3 each made of thin copper plates and 0.1 mm in thickness and placed one on another were joined according to the above-described method. The pressure applied to the thin copper plates was 0.6 kg/mm². The conductive members were heated to 650° C. in fifteen seconds by applying electric current (AC 14,800 A) to the electrodes 1 and 2. The heating temperature T was a value which satisfies $T(°K.)/T_m(°K.) = 0.4 \sim 0.8$ where $T_m$ is the melting point (1356° K.) of copper. Thereafter, the temperature of the conductive members was maintained at a temperature $T \pm 50°$ C. for one minute by turning the power switch on and off. Then, the laminated thin copper plates were allowed to stand in the air until the temperature thereof was decreased to 300° C. Thereafter, the conductive members were quickly cooled in water (about 15° C.) from an ordinary water supply.

FIG. 3 shows a microscope picture of the section, enlarged 170 times, of the laminated thin copper plates 3 thus joined. Regular boundaries attributing to solid phase diffusion can be observed between the thin copper plates 3. Furthermore, it can be confirmed that each thin copper plate 3 has its own organization, and is not affected by joining, and the flexibility thereof is maintained.

EXAMPLE 2

Figure 4:
FIGS. 4 and 5 are a microscope picture of the section, enlarged 126 times of a second example of the laminated conductor manufactured according to the method of the invention, and a picture showing a front view of the same, respectively.
Figure 5:
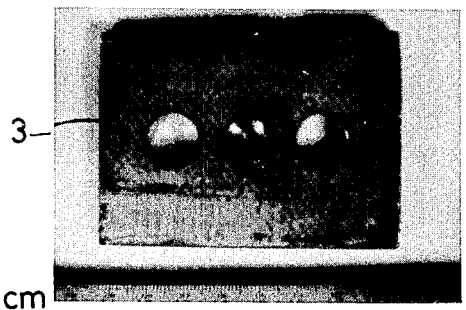

Laminated thin copper plates (each 0.1 mm in thickness) and copper plates (2 mm in thickness) which were placed one on another were joined in a manner similar to that in Example 1. FIG. 4 shows a microscope picture of the section, enlarged 126 times, of the laminated conductor thus obtained. FIG. 5 shows a picture of the laminated conductor which was used for a long period of time by being tightened with screws inserted into holes formed therein. As is apparent from FIG. 5, no holes were deformed although the laminated conductor was kept tightened for a long period of time. Furthermore, it is clear from the microscope picture of the section that the layers of the thin copper plates 3 and the copper plates 5 are uniform, cave-in due to the creep of the tightening screw seat is prevented by the flexibility of the thin copper plates 3, and the contact surface is scarcely affected by tightening the conductive members.

EXAMPLE 3

Thin copper plates 6 (0.1 mm in thickness) both surfaces of each of which were plated with silver Ag to 3μ were placed on the outermost surfaces of laminated thin copper plates 3 (each 0.1 mm in thickness). These plates were joined in a manner similar to that in Example 1. FIG. 6 shows a microscope picture of the section, enlarged 170 times, of the laminated conductor thus formed. As is seen in FIG. 6, each Ag layer was not affected by the diffusion joining, that is, its linear state was maintained unchanged. Therefore, an after-treatment, or an Ag plating process, can be eliminated. The silver layers are free from corrosion, and the silver layers of the copper plates joined to the laminated thin copper plates have excellent performance as the contact surfaces.

EXAMPLE 4

A copper plate 7 (2 mm in thickness) placed on a braided copper wire 8 was joined in a manner similar to that in Example 1. FIG. 7 shows a picture of the conductor thus formed. The conductor is useful as a conductor of a switch which is small in current capacity and is frequently operated. Similarly as in Example 2, cave-in due to the creep of the screw tightening seat is prevented, and its mechanical strength is improved. Thus, the conductor can be used as a satisfactory contact end component.

EXAMPLE 5

Figure 8:
FIG. 8 shows a microscope picture of the section, enlarged 150 times, of the junction of a copper contact support and a silver-cadmium alloy contact obtained by the fifth example of the present invention.

A contact support made of copper and a contact made of silver-cadmium alloy were joined together according to the above-described method. The atmosphere used was the air. The pressure applied to the contact support and the contact was 0.4 kg/mm². The contact support and the contact were heated to 650° C. in three seconds by feeding current (AC 9,000 A) between the electrodes 1 and 2. Water from an ordinary water supply was used as cooling water (the water temperature being 15° C.) FIG. 8 shows a microscope picture of the section, enlarged 150 times, of the electrical contactor thus manufactured. As is apparent from FIG. 8, no alloy layer lowering the heat-resistance is observed at the junction of the copper contact support and the silver-cadmium alloy contact, and the joining condition is ideal. FIG. 9 is a graphical representation schematically indicating the results of the analysis of the junction of the electrical contactor, which was conducted by using an X-ray microanalyser. As is clear from FIG. 9, it was confirmed that a diffusion layer several microns in thickness was formed by mutual diffusion between the silver and the copper.

EXAMPLE 6

Figure 10:
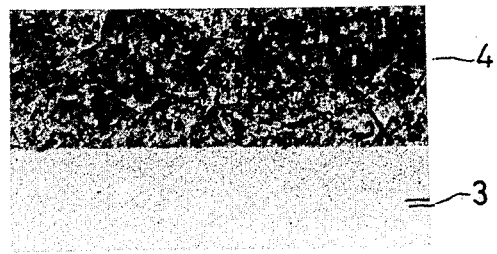
FIG. 10 shows a microscope picture of the section, enlarged 62 times, of the junction of a brass contact support and a sintered silver-cadmium oxide alloy contact which are joined according to the sixth example of the invention and subjected to interruption test.

A contact support of brass and a contact of sintered silver-cadmium oxide alloy were joined together in a manner similar to that in Example 5. FIG. 10 shows a microscope picture of the section, enlarged 62 times, of the electrical contactor which was subjected to interruption test. No abnormal conditions were found at the junction of the contact support and the contact although the electrical contactor was heated at high temperature in the interruption test.

Typical examples of the combinations of materials useful for the contact support and the contact, which can be joined according to the joining method of the invention are as indicated in the following Table, in which 0 means that the relevant materials can be joined.

| Contact support | Contact | | | | | |
|---|---|---|---|---|---|---|
| | Ag | Ag—Ni | Ag—Cdo | Ag—Cd | Ag—W | Ag—WC |
| Cu | 0 | 0 | 0 | 0 | 0 | 0 |
| BsR | 0 | 0 | 0 | 0 | 0 | 0 |
| PBB | 0 | 0 | 0 | 0 | 0 | 0 |
| BeCu | 0 | 0 | 0 | 0 | 0 | 0 |
| Al + Ag plating | 0 | 0 | 0 | 0 | 0 | 0 |
| BsR + Ag plating | 0 | 0 | 0 | 0 | 0 | 0 |
| SPCC SS41 + Ag plating | 0 | 0 | 0 | 0 | 0 | 0 |
| CuFe | 0 | 0 | 0 | 0 | 0 | 0 |

In the invention, the contact support and the contact are directly joined together by diffusion. Therefore, the invention has the following various merits:

(a) No flux or brazing-material is necessary.

(b) As a low melting point alloy layer is eliminated, the heat resistance is increased. As the volume of the contactor can be reduced, the price of the contact means can be decreased.

(c) No void is formed.

(d) The properties of the base materials can be maintained unchanged.

(e) The method contributes to automation, labor-savings and mass production, (f) Joining and heat treatment can be carried out simultaneously.

(g) Countermeasures against the fumes of oxidized cadmium, which are generated when brazing material is molten, are unnecessary.

(h) The manufacturing cost of contactors can be readily reduced by changing the materials.

(i) For Ag-Cd contacts, it is unnecessary to subject the junctions for silver plating.

According to the invention, with the simple device, laminated conductors of electrical equipment can be manufactured on a large scale. Furthermore, the invention can be applied to the production of laminated conductors which are variable in kind but small in quantity. Accordingly, the manufacturing cost can be reduced. Because of the physical, chemical and mechanical natures and the feature of solid phase joining, the laminated conductor manufactured according to the invention is excellent in electrical performance; that are the electrical properties similar to those which the materials had before joining. The difficulties accompanying the joining method using high temperature are eliminated. Furthermore, after joining, it is unnecessary to conduct silver plating. Thus, the number of manufacturing steps is reduced. The effects of the invention as to improvement are considerably significant. In addition, the invention is advantageous in that, when a laminated conductor is formed by using thin plates about 0.1 mm in thickness according to the method of invention, flexibility can be given to the laminated conductor.

The method of the invention can be employed in combination with other joining methods. For instance, in pressurizing and heating the conductive members with the electrodes, a brazing agent may be dropped to the conductive members.

It should be noted that the method of the invention can be used in combination with other joining methods. For instance, in pressurizing and heating the contact support and the contact with the electrodes, a brazing agent may be dropped between the contact support and the contact.

What is claimed is:

1. A solid phase bonding method for joining a plurality of electrically conductive members, made from copper, silver, an alloy of copper or silver, a copper-coated material, silver-coated material or a like material which is used as an electrical switch contact or other conductive element, said method comprising the steps of inserting said conductive members in stacked relationship between two carbon electrodes with no adhesive materials between said conductive members, said carbon electrodes having confronting parallel surfaces and disposed in an air atmosphere, heating said conductive members up to a bonding temperature in a period of time on the order of ten seconds, where said bonding temperature falls in a range between 0.4 TM and 0.8 TM where TM represents the melting temperature of any of said conductive members, and maintaining the temperature of said conductive members in the vicinity of said bonding temperature for one to three minutes by feeding electric current between said electrodes while said conductive members are pressurized at a pressure substantially between 0.02 kg/mm$^2$ and 1 kg/mm$^2$ between said electrodes.

2. A method as claimed in claim 1, further comprising the step of cooling said conductive members after said heating step.

3. A method as claimed in claim 2, wherein said conductive members are formed of copper, and are heated to a temperature of 270° C. to 810° C. in approximately 15 seconds.

4. A method as claimed in claim 2, wherein said conductive members are formed of copper and silver-cadmium alloy, and are heated to a temperature of 400° C. to 900° C. in a time equal to or shorter than 10 seconds.

5. A method as claimed in claim 2, wherein said cooling is carried out by quenching.

* * * * *